US012647256B2

(12) United States Patent
Badrinarayanan et al.

(10) Patent No.: US 12,647,256 B2
(45) Date of Patent: Jun. 2, 2026

(54) THRESHOLD SEARCHABLE SYMMETRIC ENCRYPTION

(71) Applicant: VISA INTERNATIONAL SERVICE ASSOCIATION, San Francisco, CA (US)

(72) Inventors: Saikrishna Badrinarayanan, Fremont, CA (US); Pratyay Mukherjee, Sunnyvale, CA (US); Sikhar Patranabis, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 91 days.

(21) Appl. No.: 18/845,824

(22) PCT Filed: Mar. 17, 2023

(86) PCT No.: PCT/US2023/064655
§ 371 (c)(1),
(2) Date: Sep. 10, 2024

(87) PCT Pub. No.: WO2023/183760
PCT Pub. Date: Sep. 28, 2023

(65) Prior Publication Data
US 2025/0247215 A1 Jul. 31, 2025

Related U.S. Application Data

(60) Provisional application No. 63/322,091, filed on Mar. 21, 2022.

(51) Int. Cl.
*H04L 9/08* (2006.01)
*H04L 9/32* (2006.01)

(52) U.S. Cl.
CPC ............ *H04L 9/085* (2013.01); *H04L 9/0825* (2013.01); *H04L 9/3231* (2013.01); *H04L 9/3271* (2013.01)

(58) Field of Classification Search
CPC ..... H04L 9/085; H04L 9/3231; H04L 9/0825; H04L 9/3271; H04L 9/3247
(Continued)

(56) References Cited

U.S. PATENT DOCUMENTS

| 8,135,134 B2 * | 3/2012 | Orsini | H04L 63/0807 |
| | | | 380/278 |
| 9,111,115 B2 * | 8/2015 | Camenisch | H04L 9/3073 |

(Continued)

FOREIGN PATENT DOCUMENTS

| KR | 20220033480 A | 3/2022 |

OTHER PUBLICATIONS

Agrawal et al., "BETA: Biometric Enabled Threshold Authentication", International Association for Cryptologic Research, Jun. 8, 2020, pp. 1-70.

(Continued)

*Primary Examiner* — Amare F Tabor
(74) *Attorney, Agent, or Firm* — Kilpatrick Townsend & Stockton LLP

(57) ABSTRACT

A data owner can provide shares of a cryptographic key to N key servers. The N key servers can store the shares of a cryptographic key from the data owner such that T shares of the cryptographic key can be used to reconstruct the cryptographic key. A client computer can send a blinded query to T key servers of the N key severs, wherein the T key servers can encrypt a blinded query of a client computer using the share of the cryptographic key to determine a partial encryption. The client computer can receive T partial encryptions, assemble T partial encryptions to form an encrypted blinded query, and deblind the encrypted blinded query. The client computer can then use the encrypted query to perform a search on encrypted data of a remote database server using a searchable symmetric encryption scheme.

16 Claims, 8 Drawing Sheets

400

(58) Field of Classification Search
USPC ......................................................... 713/171
See application file for complete search history.

(56) References Cited

U.S. PATENT DOCUMENTS

| | | | |
|---|---|---|---|
| 10,621,164 B1 * | 4/2020 | Kain | ..................... G06F 16/215 |
| 10,783,263 B2 * | 9/2020 | Rane | ....................... H04L 9/085 |
| 11,126,742 B2 | 9/2021 | Yeo et al. | |
| 11,251,944 B2 * | 2/2022 | Bunch | .................. H04L 63/062 |
| 11,296,879 B2 * | 4/2022 | Tysor | .................... H04L 9/3239 |
| 2018/0212751 A1 | 7/2018 | Williams et al. | |
| 2018/0234496 A1 | 8/2018 | Ratias | |
| 2019/0103970 A1 | 4/2019 | Koszek | |
| 2022/0036348 A1 | 2/2022 | Srivastava et al. | |

OTHER PUBLICATIONS

Application No. EP23775813.1 , Extended European Search Report, Mailed On Jun. 13, 2025, 8 pages.
Kermanshahi et al., "Multi-client Cloud-based Symmetric Searchable Encryption", Institute of Electrical and Electronics Engineers Transactions on Dependable and Secure Computing, vol. 18, No. 5, Sep.-Oct. 2021, pp. 2419-2437.
Guo et al., "Multi-User Searchable Symmetric Encryption with Dynamic Updates for Cloud Computing", Information, vol. 2, No. 10, Sep. 28, 2018, pp. 1-14.
Application No. PCT/US2023/064655 , International Search Report and Written Opinion, Mailed On Jun. 26, 2023, 9 pages.

\* cited by examiner

100

S106

ENCRYPTED DATA 105

REMOTE DATABASE SERVER 104

S104

S108

CRYPTOGRAPHIC KEY 103

S102

S110

DATA OWNER COMPUTER 102

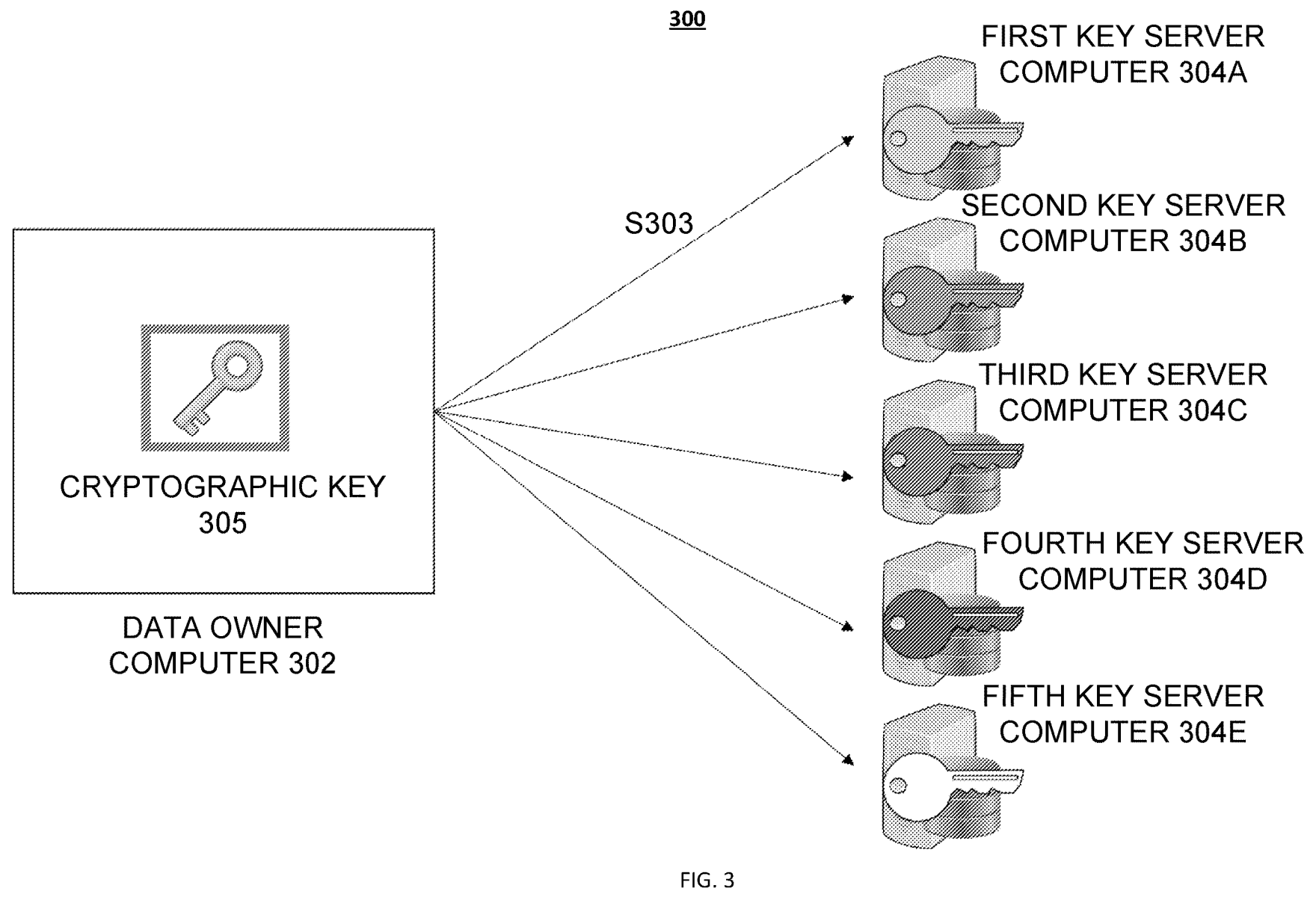

300

FIRST KEY SERVER COMPUTER 304A

SECOND KEY SERVER COMPUTER 304B

THIRD KEY SERVER COMPUTER 304C

FOURTH KEY SERVER COMPUTER 304D

FIFTH KEY SERVER COMPUTER 304E

S303

CRYPTOGRAPHIC KEY 305

DATA OWNER COMPUTER 302

FIG. 3

510    TRANSMIT A BLINDED QUERY TO T KEY SERVER COMPUTERS OF N KEY SERVER COMPUTERS

520    RECEIVE T PARTIAL ENCRYPTIONS OF THE BLINDED QUERY

530    GENERATE AN ENCRYPTED QUERY TOKEN BY DEBLINDING AND ASSEMBLING THE T PARTIAL ENCRYPTIONS

540    PERFORM AN ENCRYPTED SEARCH OF THE REMOTE DATABASE SERVER USING THE ENCRYPTED QUERY TOKEN

THRESHOLD SEARCHABLE SYMMETRIC ENCRYPTION

CROSS-REFERENCES TO RELATED APPLICATIONS

This application is a 371 patent application of PCT application number PCT/US2023/064655, filed Mar. 21, 2022, which claims priority to U.S. provisional application No. 63/322,091 filed on Mar. 21, 2022, which is herein incorporated by reference in its entirety.

BACKGROUND

Increasing amount of data has led many companies to outsource their data into a $3^{rd}$ party remote database server. When companies later want to search on the outsourced data, a query is sent to the remote database server. However, the companies may want to outsource their data in a private manner and keep their queries secret, as they would not want to expose their data and queries to the remote database server.

Searchable symmetric encryption enables a party (e.g., company) to encrypt the data locally and outsource it to the database server while maintaining search (query) capability. This allows the party to outsource the storage of its data to another party (e.g., a remote database server) in a private manner while maintaining the ability to perform an encrypted search. However, a searchable symmetric encryption requires the data owner to have a cryptographic key to encrypt the query and decrypt an encrypted response to the query. This severely limits cases in which the data owner has multiple clients (e.g., employees) who may want to perform encrypted searches on the encrypted data of the remote database server.

Embodiments of the disclosure address this problem and other problems individually and collectively.

SUMMARY

One embodiment of the invention can include a method of performing a threshold searchable symmetric encryption by a client computer. The method can transmit a blinded query to T key server computers of N key server computers, wherein the N key server computers can store shares of a cryptographic key from a data owner computer, wherein T can be an integer less than or equal to N, wherein T shares can be required to reconstruct the cryptographic key, wherein the blinded query can be generated from a query configured to be sent to a remote database server that stores encrypted data. The method can then receive, from the T key server computers, T partial encryptions of the blinded query; wherein each of the T partial encryptions can be generated by applying a first cryptographic function to the blinded query using a respective share of the T shares of the cryptographic key. The method can generate an encrypted query token by deblinding and assembling the T partial encryptions and perform an encrypted search on the remote database server using the encrypted query token.

These and other embodiments of the disclosure are described in detail below. For example, other embodiments are directed to systems, devices, and computer readable media associated with methods described herein.

A better understanding of the nature and advantages of embodiments of the invention may be gained with reference to the following detailed description and accompanying drawings.

BRIEF DESCRIPTION OF THE DRAWINGS

FIG. 3 shows a diagram illustrating a process of a data owner computer transmitting shares of a cryptographic key to N key server computers.

TERMS

Figure 1:
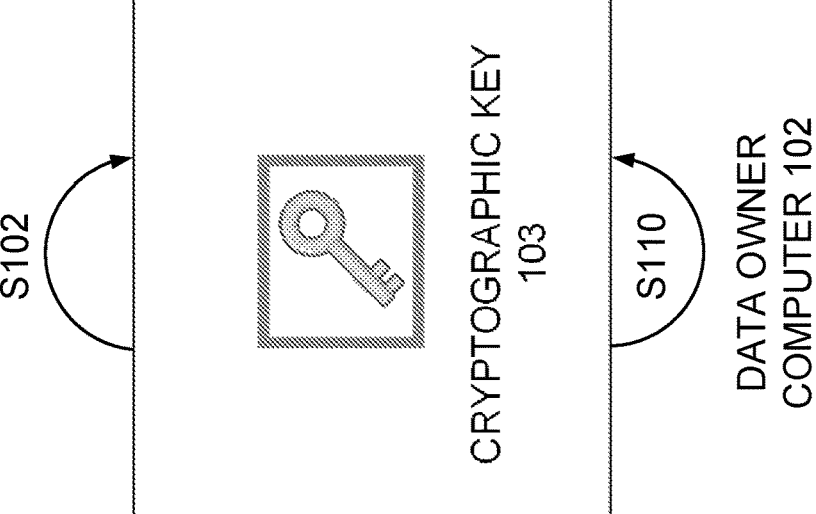
FIG. 1 shows a diagram illustrating a process of a data owner computer performing an encrypted search on a remote database server.

Prior to discussing embodiments of the disclosure, some terms can be described in further detail.

A "user" may include an individual or a computational device. In some embodiments, a user may be associated with one or more personal accounts and/or mobile devices. In some embodiments, the user may be an account holder.

A "user device" may be any suitable device that a user can interact with (e.g., a mobile phone, a laptop). User devices may be in any suitable form. Some examples of user devices include cellular phones, PDAs, personal computers (PCs), tablet computers, and the like. In some embodiments, where a user device is a mobile device, the mobile device may include a display, a memory, a processor, a computer-readable medium, and any other suitable component.

A "client computer" may refer to a computer that uses the services of other computers or devices, such as server computers. A client computer may connect to these other computers or devices over a network such as the Internet. As an example, a client computer may comprise a laptop computer that connects to an image hosting server in order to view images stored on that image hosting server.

A "pseudorandom function" may refer to a deterministic function that produces an output that appears random. Pseudorandom functions may include collision resistant hash functions and elliptic curve groups. A pseudorandom function may approximate a random oracle, an ideal cryptographic primitive that maps an input to a random output from its output domain. A pseudorandom function can be constructed from a pseudorandom number generator.

A "cryptographic function" is a mathematical equation, function, process, or algorithm that may be used to encrypt or decrypt information. Some cryptographic functions are one-way functions, such as hash functions. Other cryptographic functions may be reversible if a designated input, such as a key, is provided.

The term "public/private key pair" may include a pair of linked cryptographic keys generated by an entity (e.g., a computing device or an electronic device). The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on elliptic curve cryptography (ECC), lattice or code based cryptosystems such as McEliece or learning with errors (LWE) which may be post-quantum secure.

DETAILED DESCRIPTION

Searchable symmetric encryption enables a data owner (e.g., a company) to encrypt data locally using a cryptographic key and outsource the encrypted data to the remote database server while maintaining search (query) capability. This allows the data owner to outsource the storage of its data to another party (e.g., remote database server) in a private manner while maintaining the ability to selectively search (query).

To run a query on the encrypted data outsourced to the remote database server, the data owner encrypts the query using the cryptographic key to determine an encrypted query token. The data owner can then perform an encrypted search on the encrypted data of the remote database server and receive an encrypted response from the remote database server. The data owner would then decrypt the encrypted response using the cryptographic key to access the decrypted response (i.e., the result of the query inside the encrypted response).

However, there can exist several limitations with the searchable symmetric encryption. One limitation is that having just a single data owner possess the cryptographic key can be a big security risk as if the data owner gets corrupted, the cryptographic key the data owner possesses can get corrupted. Another limitation is that there can be multiple clients (e.g., employees) who may want to perform encrypted searches on the encrypted data in the remote database server. Since providing the cryptographic key to each of the multiple clients compromises security, the multiple clients can communicate with the data owner to encrypt queries and decrypt encrypted responses. However, the multiple clients may want to perform the encrypted searches at any random time, leading the data owner to be always active and online, which may not always be practically feasible.

Embodiments can solve these limitations by using a threshold searchable symmetric encryption. The embodiment can have the data owner provide shares of a cryptographic key to N key servers. The N key servers can store the shares of a cryptographic key from the data owner such that T shares of the cryptographic key can be used to reconstruct the cryptographic key. The T may be an integer less than N. By providing the shares of the cryptographic key among the N key servers, the searchable symmetric encryption can still be performed even if some of the key servers are corrupted. For example, if there are five key servers having shares of a cryptographic key and the value of T is three, then the cryptographic key can be reconstructed to perform the searchable symmetric encryption even if two of the five key servers are corrupted. Additionally, instead of communicating directly with the data owner, the multiple clients can now communicate with the key servers to encrypt queries and decrypt encrypted responses.

I. Searchable Symmetric Encryption (SSE)

Searchable symmetric encryption enables a data owner (e.g., company) to encrypt data locally and outsource it to a remote database server while maintaining a search (query) capability. However, certain techniques of performing a searchable symmetric encryption can come with several limitations.

One limitation is that if the data owner gets corrupted, a cryptographic key used in the searchable symmetric encryption can get corrupted. This limitation is further illustrated in FIG. 1. Another limitation is that there can be multiple clients who may want to perform encrypted searches on the encrypted data. Since sharing the cryptographic key to each of the multiple clients is a big security risk, the multiple clients may need to communicate with the data owner to encrypt queries. However, since the multiple clients can perform the encrypted searches at any random times, the data owner may need to always stay active and online. However, this may not be practically feasible. This limitation is further illustrated in FIG. 2.

A. Searchable Symmetric Encryption

A data owner computer can outsource its encrypted data to a remote database server. The encrypted data can be data encrypted by the data owner computer using a cryptographic key such that the data is kept secret to the remote database server. The data owner computer can perform an encrypted search on the encrypted data using a searchable symmetric encryption scheme.

FIG. 1 shows a diagram illustrating a data owner computer 102 with a cryptographic key 103 performing an encrypted search on an encrypted data 105 stored in a remote database server 104 using a searchable symmetric encryption. The encrypted data 105 can be data outsourced by the data owner computer to the remote database server 104 that has been encrypted using the cryptographic key 103 by the data owner computer 102. The cryptographic key 103 can be a symmetric key that can be used to perform both encryption and decryption algorithms.

In step S102, the data owner computer 102 can encrypt a query using the cryptographic key 103 to determine an encrypted query token. The query can be in different database languages such as structured query language (SQL), MongoDB Query Language (MQL), etc.

In step S104, the data owner computer 102 can transmit the encrypted query token to the remote database server 104. Since the encrypted query token is encrypted using the cryptographic key 103, even if a malicious party (e.g., hacker) intercepts the encrypted query token, the query information can be kept safe.

In step S106, upon receiving the encrypted query token, the remote database server 104 can perform a search using the encrypted query token on the encrypted data 105 and obtain an encrypted response. The encrypted response may be encrypted in such a way that it can only be decrypted by using the cryptographic key 103, and the response of the search is kept secret from the remote database server 204. In some embodiments, the query can be an update request and the remote database server 104 can perform an update using the encrypted query token on the encrypted data 105.

In step S108, the remote database server 104 can transmit the encrypted response to the data owner computer 102. Similar to the encrypted query token, the encrypted response can be kept safe from the malicious party.

In step S110, the data owner computer 102 can decrypt the encrypted response using the cryptographic key 103 to access the decrypted response. The decrypted response can be a result of the query on the encrypted data 105.

The data owner computer 102 storing the cryptographic key comes with a risk. Since the data owner computer 102 is the only party with the access to the cryptographic key 103, if the data owner computer 102 is attacked and gets corrupted, the cryptographic key 103 used in the searchable symmetric encryption can also be corrupted. Since there is only one copy of the cryptographic key 103, the data owner computer 102 may be put into the risk of permanently losing an ability to perform the searchable symmetric encryption.

B. Searchable Symmetric Encryption Involving A Client

A data owner computer can have many client computers that want to perform searches on the encrypted data outsourced to a remote database server. The client computers can communicate with the data owner computer to perform encrypted searches on the encrypted data using a searchable symmetric encryption scheme.

Figure 2:
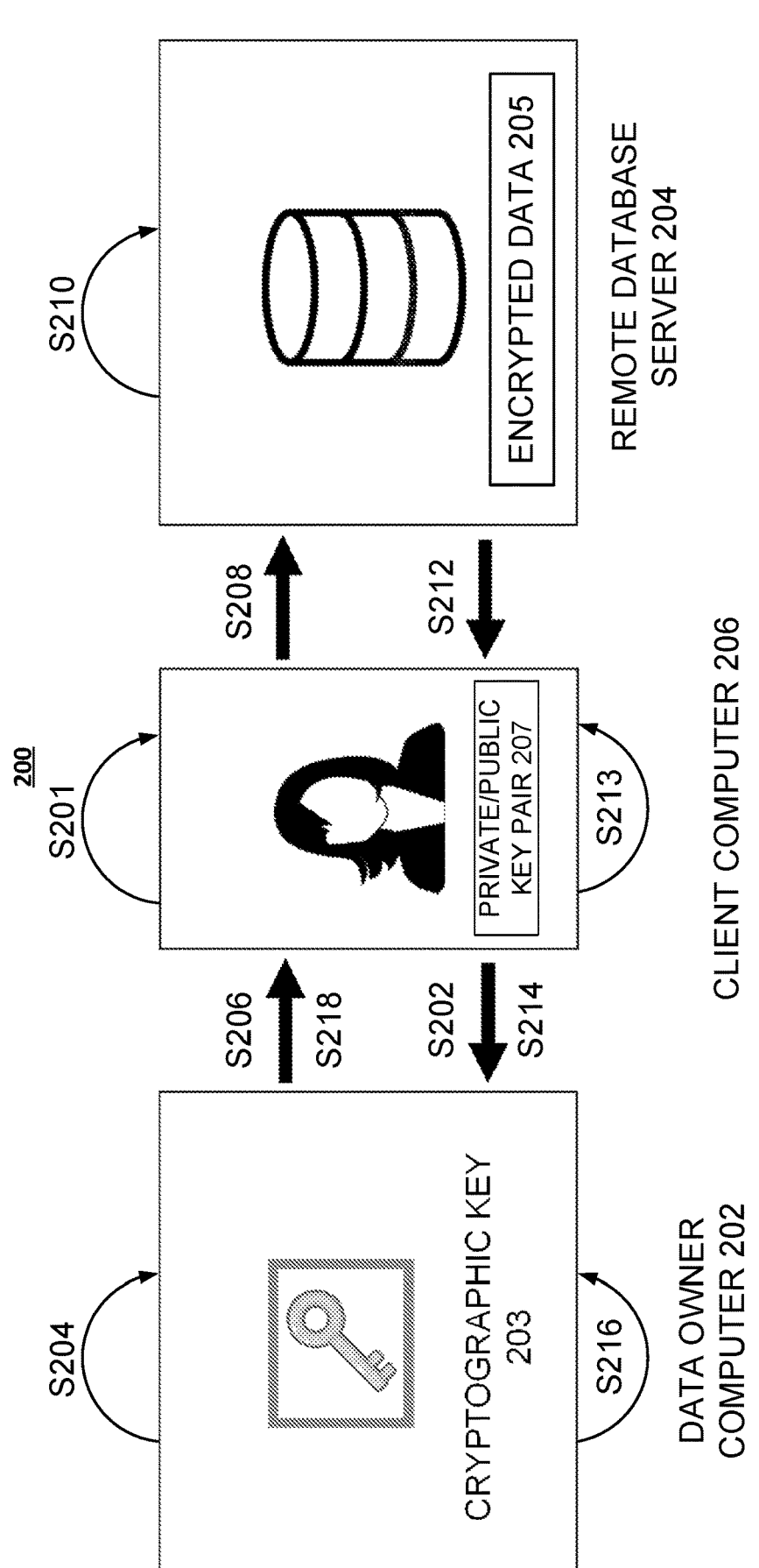
FIG. 2 shows a diagram illustrating a process of a client computer performing an encrypted search on a remote database server.

FIG. 2 shows a diagram illustrating a client computer 206 communicating with a data owner computer 202 with a cryptographic key 203 and a remote database server 204 with an encrypted data 205 to perform an encrypted search on the remote database server 204 using a searchable symmetric encryption. The encrypted data 205 can be data outsourced by the data owner computer 202 to the remote database server 204 that has been encrypted by the data owner computer 202 using the cryptographic key 203. In some embodiment, there can be multiple client computers communicating with the data owner computer 202 and the remote database server 204 to perform encrypted searches using the searchable symmetric encryption.

In step S202, the client computer 206 can have a query to search on the encrypted data 205. Since the client computer 206 does not have a cryptographic key to encrypt the query to perform an encrypted search on the encrypted data 205, the client computer 206 needs to send the query to the data owner computer 202 to encrypt the query. Since the client computer 206 may not want the data owner computer 202 to know the query, the client computer 206 can blind the query with randomness that only the client computer 206 knows. For instance, the query can be blinded by raising to a power of a random value. The client computer can send the blinded query to the data owner computer 202 that has the cryptographic key necessary to encrypt the query.

In step S204, the data owner computer 202 can encrypt the blinded query using the cryptographic key 103 to determine an encrypted blinded query token. The query is kept secret to the data owner computer 202 as the query is blinded.

In steps S206, the data owner computer 202 can send encrypted blinded query token to the client computer 206. Since the encrypted query token is encrypted using the cryptographic key 103, even if a malicious party (e.g., hacker) intercepts the encrypted query token, the query information can be kept safe. The client computer 206 can then deblind the encrypted blinded query token to determine an encrypted query token.

In some embodiments, steps S202 to S206 may be operated using an oblivious pseudorandom function (PRF). The oblivious PRF can be used for a two-party protocol between the data owner computer (sender) 202 and the client computer (receiver) 206 for securely computing an encryption ($f_k$) using the cryptographic key (k) on the query (input x). The oblivious PRF can allow the client computer 206 to learn the encrypted query token (output $f_k(x)$) while the data owner computer 202 learns nothing (e.g., query) from the interaction. This enables the client computer 206 to keep the query secret to the data owner computer 202 while still obtaining the encrypted query token necessary to perform a search on the encrypted data 205.

One way to construct the oblivious pseudorandom function (PRF) can have a following scheme:

1. The receiver starts the oblivious PRF by selecting a query (input x).
2. The receiver computes a random number r, which is used as a random value to blind the query.
3. The receiver computes a hash or other cryptographic function of the query H(x).
4. The receiver computes a blinded query by raising the hash of the query with the random value ($a=H(x)^r$) and sends it to the sender. In some embodiments, the receiver may skip step 3 and blind the query directly ($a=x^r$).
5. The sender uses a cryptographic key (k) to encrypt the blinded query, e.g., by raising the blinded query with the cryptographic key ($b=a^k$) and sends the encrypted blinded query (b) to the receiver. Modular mathematics or elliptic curves may be used on the encrypted blinded query (b) such that the receiver cannot obtain the cryptographic key (k).
6. The receiver deblinds the encrypted blinded query (b) by raising the reciprocal of the random value (1/r) to determine the encrypted query ($b^{(1/r)}=H(x)^k$). In some embodiments, the encrypted query can be ($b^{(1/r)}=x^k$).

In step S208, the data owner computer 202 can send the encrypted query token to the client computer 206. The encrypted query token can be kept safe from the malicious party due to encryption similar to step S206.

In step S210, upon receiving the encrypted query token from the client computer 206, the remote database server 204 can perform a search using the encrypted query token on the encrypted data 205 and obtain an encrypted response. The encrypted response may be encrypted in such a way that it can only be decrypted by using the cryptographic key 203, and the response of the search is kept secret from the remote database server 204. In some embodiments, the query can be an update request and the remote database server 104 can perform an update using the encrypted query token on the encrypted data 105. This step can be similar to step S106 of FIG. 1.

In step S212, the remote database server 204 can send the encrypted response to the client computer 206. Similar to step S204, the encrypted response can be kept safe from the malicious party due to encryption.

In step S214, the client computer 206 can send the encrypted response to the data owner computer 202 to get the encrypted response decrypted as the encrypted response can only be decrypted using the cryptographic key 203. Since the client computer 206 may not want the data owner computer 202 to know the result of the query inside the encrypted response, the client computer 206 can blind the encrypted response with randomness that only the client computer 206 knows. For instance, the blinded encrypted response can be blinded by raising to a power of a random value. The randomness can be the same randomness used to blind the query in step S202. The client computer can send the blinded encrypted response to the data owner computer 202 that has the cryptographic key necessary to decrypt the encrypted response.

In step S216, upon receiving the blinded encrypted response from the client computer 206, the data owner computer 202 can decrypt the blinded encrypted response using the cryptographic key 203 to access the blinded response of the query.

In step S218, the data owner computer 202 can send the blinded response to the client computer 206. The client computer 206 can deblind the blinded response to determine decrypted response (i.e., result of the query).

In some embodiments, steps S214 to S218 may be operated using an oblivious pseudorandom function (PRF). The oblivious PRF can be used for a two-party protocol between the data owner computer (sender) 202 and the client computer (receiver) 206 for securely computing a decryption ($f_k$) using the cryptographic key (k) 203 on the encrypted response (input x). The oblivious PRF allows the client computer 206 to learn the decryption of the encrypted response (output $f_k(x)$) while the data owner computer 202 learns nothing from the interaction. This enables the client computer 206 to keep the encrypted response secret to the data owner computer 202 while still obtaining the response from the data owner computer 202.

Although not shown FIG. 2 there may be multiple client computers wanting to perform searches on the encrypted data 205 stored in the remote database server 204. As an illustrative example, there may be multiple employee computers (client computers) trying to perform searches on the company database (encrypted data). For the multiple client computers to perform searches, the multiple client computers need the cryptographic key 203. However, creating a secure hardware environment for each of the client computers to store the cryptographic key securely is costly, not easily available, hard to program, and less secure.

This results in the data owner computer 202 (e.g., main company computer) needing to always stay online as the multiple employee computers can transmit requests to encrypt their queries to the data owner computer at any random time. This system is not always practically feasible as the data owner computer staying online at all times can be extremely inefficient and expensive.

In order to solve the aforementioned problems in FIG. 1 and FIG. 2, a threshold searchable symmetric encryption can be used.

II. Threshold Searchable Symmetric Encryption

The threshold searchable symmetric encryption can split the cryptographic key into shares, and each share can be stored in each of N key server computers. The client computer can then send a blinded query to T key server computers of the N key server computers, where T can be an integer less than or equal to N. Each of T key server computers can apply a first cryptographic function to the blinded query to determine a partial encryption and send the partial encryption to the client. The client can then deblind and assemble T partial encryptions from the T key server computers to generate an encrypted query token. The client can then perform an encrypted search on the (e.g., using searchable encryption techniques) encrypted data using the encrypted query token.

The threshold searchable symmetric encryption enables multiple client computers to perform searches on the encrypted data of the remote database server without communicating to the data owner computer. Additionally, by distributing shares of the cryptographic key to N key server computers, the data owner computer is no longer the only entity with the possession of the cryptographic key.

A. Setup Phase

A data owner computer can have a cryptographic key that can be used to perform an encrypted search on encrypted data outsourced to a remote database server using a searchable symmetric encryption scheme. The data owner computer can distribute N shares of the cryptographic key to N key server computers using a threshold secret sharing.

FIG. 3 shows a diagram illustrating a process of a data owner computer 302 transmitting shares of a cryptographic key 305 to N key server computers (first key server computer 304A, second key server computer 304B, third key server computer 304C, fourth key server computer 304D, and fifth key server computer 304E). Each share of the shares of the cryptographic key 305 can be unique. Therefore, no two key server computers can possess the same share of the cryptographic key 305. The cryptographic key 305 can be a symmetric key that can be used to perform both encryption and decryption algorithms.

In step S303, the data owner computer 302 can distribute shares of the cryptographic key 305 across the N key server computers (304A-304E). The threshold secret sharing allows the N key server computers to each store a share of the cryptographic key 305 from the data owner computer 302 such that any combination of T shares of the cryptographic key 305 can reconstruct the cryptographic key 305. The T shares to reconstruct the cryptographic key 305 may be always less than or equal to N shares of the cryptographic key.

As an illustrative example, the data owner computer 302 can give shares of the cryptographic key 305 to the N key server computers. The first share can go to the first key server computer 304A, the second share can go to the second key server computer 304B, the third share can go to the third key server computer 304C, the fourth share can go to the fourth key server computer 304D, and the fifth share can go to the fifth key server computer 304E. These shares can be combined in such a way that any T shares among the N shares can reconstruct the cryptographic key 305. If T is equal to three, then shares of cryptographic key 305 from any three key server computers can be combined to reconstruct the cryptographic key 305.

As a result, even if some key server computers that carry shares of the cryptographic key are corrupted, as long as there are T key server computers that are not corrupted, the cryptographic key can be reconstructed. For example, even if the first key server computer 304A and the second key server computer 304B are corrupted, if T is equal to three, shares of the third key server computer 304C, the fourth key server computer 304D, and the fifth key server computer 304E can be used to reconstruct the cryptographic key.

B. Query Phase

Each of N key server computers can have a share of the cryptographic key using a threshold secret sharing scheme from FIG. 3. A client computer can transmit its blinded query to T key server computers to encrypt the blinded query. The client computer can then deblind the encrypted blinded query and perform an encrypted search on encrypted data using the encrypted query. The encrypted data can be data encrypted by the data owner computer using the cryptographic key and outsourced to the remote database server 410.

Figure 4:
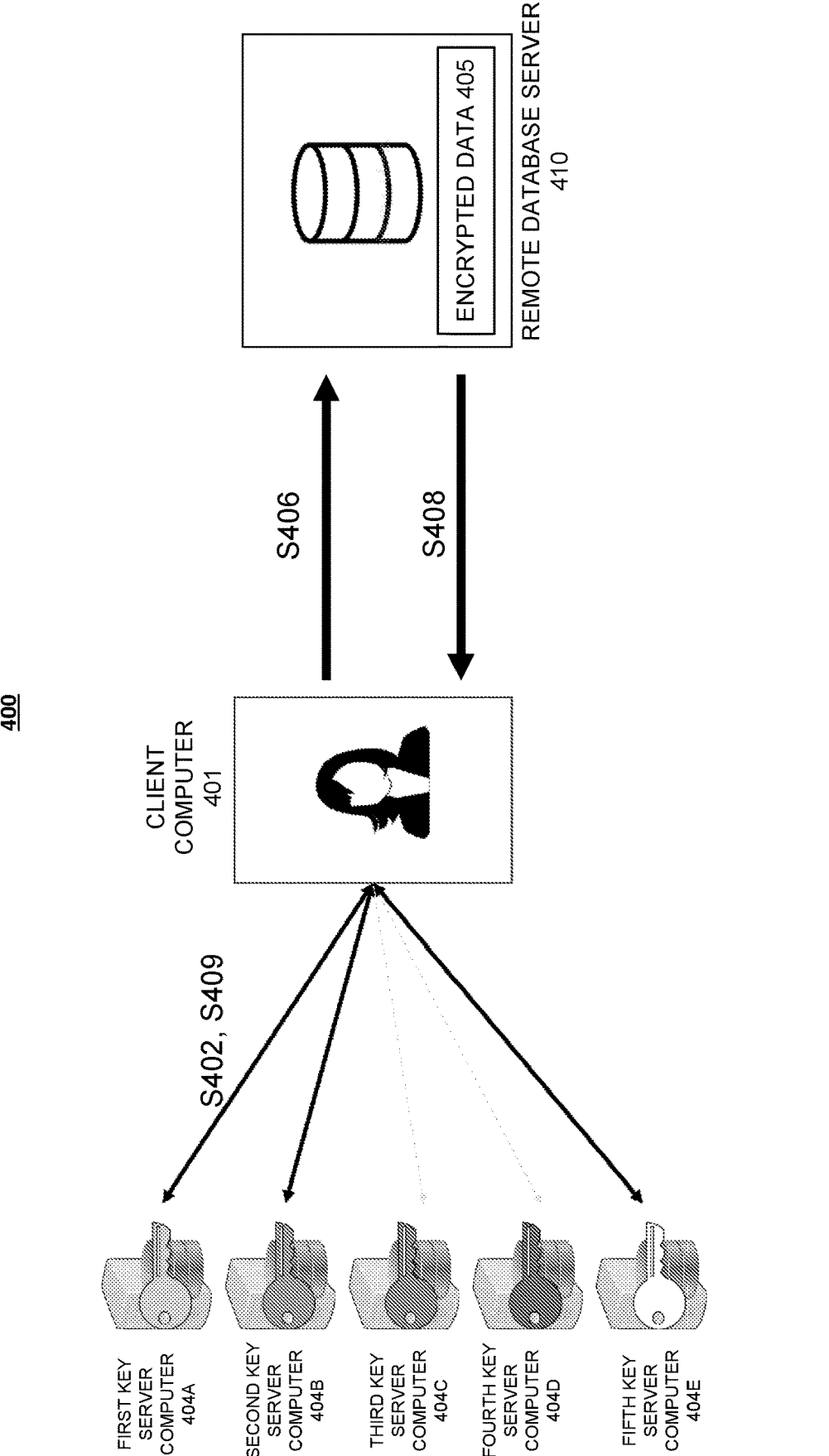
FIG. 4 shows a diagram illustrating a process of a client computer obtaining and using an encrypted query token to perform an encrypted search on a remote database server.

FIG. 4 shows a diagram illustrating a process of a client computer 401 obtaining an encrypted query token from T key server computers of N key server computers to perform an encrypted search on a remote database server 410 with an encrypted data 405 using a threshold searchable symmetric encryption. In some embodiment, there can be multiple client computers communicating with the T key server computers and the remote database server 410 to perform encrypted searches using the threshold searchable symmetric encryption.

Each of the N key server computers can have a share of the cryptographic key from the setup phase in FIG. 3. Each of the T key server computers of the N key sever computers can use the share of the cryptographic key to perform an encryption on a blinded query to determine a partial encryption. T can be a number of shares that are necessary to reconstruct the cryptographic key. T can be an integer less than or equal to N.

In step S402, the client computer 401 can have a query configured to be sent to a remote database server 410 that stores the encrypted data 405. The client computer 401 can use the query to perform a search on the encrypted data 405. Since the client computer 401 does not have a cryptographic key to encrypt the query to perform an encrypted search on the encrypted data 405, the client computer 401 can transmit the query to the T key server computers to encrypt the query. Since the client computer 401 may not want the T key server computers to know the query, the client computer 401 can blind the query with randomness that only the client computer 401 knows. For instance, the query can be blinded by raising to a power of a random value. The client computer 401 can transmit the blinded query to the T key server computers that have the cryptographic key shares necessary to encrypt the query. In some embodiments, the client computer 401 can send the blinded query to X key server computers, where X is in the range of T<X≤N.

The T key server computers can be any combination of T key server computers from the N key server computers. In FIG. 4, the value of T can be 3, and the client computer 401 can send the blinded query to the first key server computer 404A, the second key server computer 404B, and the fifth key server computer 404E.

Once the blinded query is received by the T key server computers, each of the T key server computers can apply a first cryptographic function, e.g., a symmetric encryption algorithm, on the blinded query using the share of the cryptographic key to generate a partial encryption. The T key server computers can then transmit T partial encryptions to the client computer 401.

In some embodiments, step S402 may be operated using an oblivious pseudorandom function (PRF). The oblivious PRF can be used for a two-party protocol between each key server computer (sender) of the T key server computers and the client computer (receiver) 401 for securely computing the first cryptographic function ($f_k$) using the share of the cryptographic key (k) on the query (input x). The oblivious PRF can allow the client computer 401 to learn the partial encryption of the query (output $f_k(x)$) while the each of the T key server computers learns nothing from the interaction. This enables the client computer 401 to keep the query secret to each of the T key server computers while still obtaining the T partial encryptions from T key server computers. The oblivious PRF can include a hash function. In such a situation, decryption can use a lookup table, e.g., as described below.

In step S406, upon receiving the T partial encryptions, the client computer 401 can deblind and assemble the T partial encryptions to generate the encrypted query token. In some embodiments, the client computer 401 can receive X partial encryptions from X key server computers, where X is in the range of <X≤N. In such case, the client computer 401 can choose T partial encryptions among the X partial encryptions to generate the encrypted query token with.

The encrypted query token can be used to perform the encrypted search on the encrypted data 405 stored inside the remote database server 410. The client computer 401 can perform the encrypted search by first transmitting the encrypted query token to the remote database server 410. The remote database server 410 can then perform a search using the encrypted query token on the encrypted data 405 to obtain an encrypted response. For example, remote database server 410 can decrypt the query token using the master key (e.g., cryptographic key 305) or a lookup table and then perform a query using the plain text of the query. As another example, the query can use homomorphic operations.

A lookup table can be used for the decryption when a hash function is used for the PRF. If the hash function is used, then encrypted query token is not directly decrypted. Instead, a predetermined set of queries can be indexed by the database. For each query, a query token is generated, using the hash function and the master key. The pre-generated token and the corresponding queries are stored in a lookup table (e.g., an encrypted search index). The token received form the client is used to access the index, which would provide the query that was used to generate the matching token. This performs a decryption, where the index is used to match the received token with a precomputed token (whose corresponding query is known). Accordingly, the remote database server can use a lookup table to determine the encrypted data corresponding to the encrypted query token, e.g., when the encrypted query token is generated using a hash function.

In this manner, the searchable encryption can create a database of key value pairs (k,v). For each key, storage of data v is outsourced to a database. Later, a user can look up data v using the key k. The OPRF is used to derive a key k'=oprf(k). An encryption of v will be at some location that can be determined using k'. Given k', one can then perform a search for the encrypted v in the database. The decryption of encrypted data v can use some other key.

Such a use of an OPRF (e.g., using a hash function) can guard access to the database lookup mechanism. Using the master key, the OPRF can generate a key k' (via partial encryptions) that allows the client to generate a query token q for the database. The query token q is sent to the database server, which looks q up in the encrypted search index, which stores pointers to the particular ciphertext that corresponds to the query. This ciphertext can then be returned to the client to be decrypted by some other key, or possibly with k'. This allows the client to not hold the sensitive master key that is used to generate the search queries. Should the database be leaked, there is still security. However, if the database and the master key is leaked, security would be lost. The OPRF using a hash is an additional level of security for the master key.

In step 408, the remote database server 410 can return the encrypted response to the client computer 401. The encrypted response can be encrypted in such a way that it can only be decrypted by using the cryptographic key. The response of the search is kept secret from the remote database server 410, as the remote database server 410 does not have the cryptographic key. In various embodiments, the encrypted response can be obtained from data that is stored in encrypted form or from data that is stored as plaintext and later encrypted by remote database server 410.

In step S409, upon receiving the encrypted response from the remote database server 410, the client computer 401 can send the encrypted response to the T key server computers of the N key server computers to get the encrypted response decrypted as the encrypted response can only be decrypted using the cryptographic key. Since the client computer 401 may not want the T key server computers to know the result of the query inside the encrypted response, the client computer 401 can blind the encrypted response with randomness that only the client computer 401 knows. For instance, the blinded encrypted response can be blinded by raising to a power of a random value. The randomness can be the same randomness used to blind the query in step S402. The client computer can send the blinded encrypted response to the T key server computers that have shares of the cryptographic key necessary to decrypt the encrypted response. In some embodiments, the client computer 401 can send the blinded encrypted response to X key server computers, where X is in the range of T<X≤N.

The client computer 401 can transmit the blinded encrypted response to the T key server computers of the N server computers: first key server computer 404A, the second key server computer 404B, and the fifth key server computer 404E. Upon receiving the query, each of the T key server computers can perform a second cryptographic function, or a symmetric decryption algorithm, on the encrypted response using the share of the cryptographic key to determine a partial decryption. The T partial decryptions of the T key server computers can be transmitted back to the client computer 401. The client computer 401 can deblind and assemble the T partial decryptions to build a decrypted response. In some embodiments, the client computer 401 can receive X partial decryptions from X key server computers, where X is in the range of T<X≤N. In such case, the client computer 401 can choose X partial decryptions among the X partial encryptions to generate the decrypted response. The decrypted response can be the result of the query on the encrypted data 405.

In some embodiments, step S409 may be operated using an oblivious pseudorandom function (PRF). The oblivious PRF can be used for a two-party protocol between each key server computer (sender) of the T key server computers and the client computer (receiver) 401 for securely computing a second cryptographic function ($f_k$) using the share of the cryptographic key (k) on the encrypted response (input x). The oblivious PRF can allow the client computer 401 to learn the partial decryption of the query (output $f_k(x)$) while the each of the T key server computers learns nothing from the interaction. This enables the client computer 401 to keep the encrypted response secret to each of the T key server computers while still obtaining the partial decryption necessary to determine a decrypted response.

One way to construct the threshold oblivious pseudorandom function (PRF) can have a following scheme:

1. The receiver starts the oblivious PRF by selecting a query (input x).
2. The receiver computes a random number r, which is used as a random value to blind the query.
3. The receiver computes a hash or other cryptographic function of the query H (x).
4. The receiver computes a blinded query by raising the hash of the query with the random value ($a=H(x)^r$) and sends it to the sender. In some embodiments, the receiver may skip step 3 and blind the query directly ($a=x^r$). In other embodiments, when a cryptographic function is used, when a cryptographic function is used, a look up table can be used for decryption, as described herein.
5. The sender uses a share $k_i$ of a cryptographic key (k) to encrypt the blinded query, e.g., by raising the blinded query with the share $k_i$ of a cryptographic key ($b_i=a^{k_i}$) and sends the partial encrypted blinded query ($b_i$) to the receiver. The partial encrypted blinded query ($b_i$) being an example of a partial encryption. Modular mathematics or elliptic curves may be used on the partial encrypted blinded query ($b_i$) such that the receiver cannot obtain the cryptographic key ($k_i$).

6. The receiver deblinds the partial encrypted blinded query ($b_i$) by raising the reciprocal of the random value (1/r) to determine the partial encrypted query ($b_i^{(1/r)} = H(x)^{k_i}$) and assembles the partial encrypted queries to obtain the encrypted query $H(x)^k$. In some embodiments, the partial encrypted query can be ($b^{(1/r)}=x^k$), with the encrypted query being $x^k$. Thus, when a hash function is not used, the threshold encryption can provide an encrypted query that can be decrypted directly, e.g., using the master key. As another example homomorphic techniques can be used, so that decryption is not necessary to perform the query.

C. Methods

Figure 5:
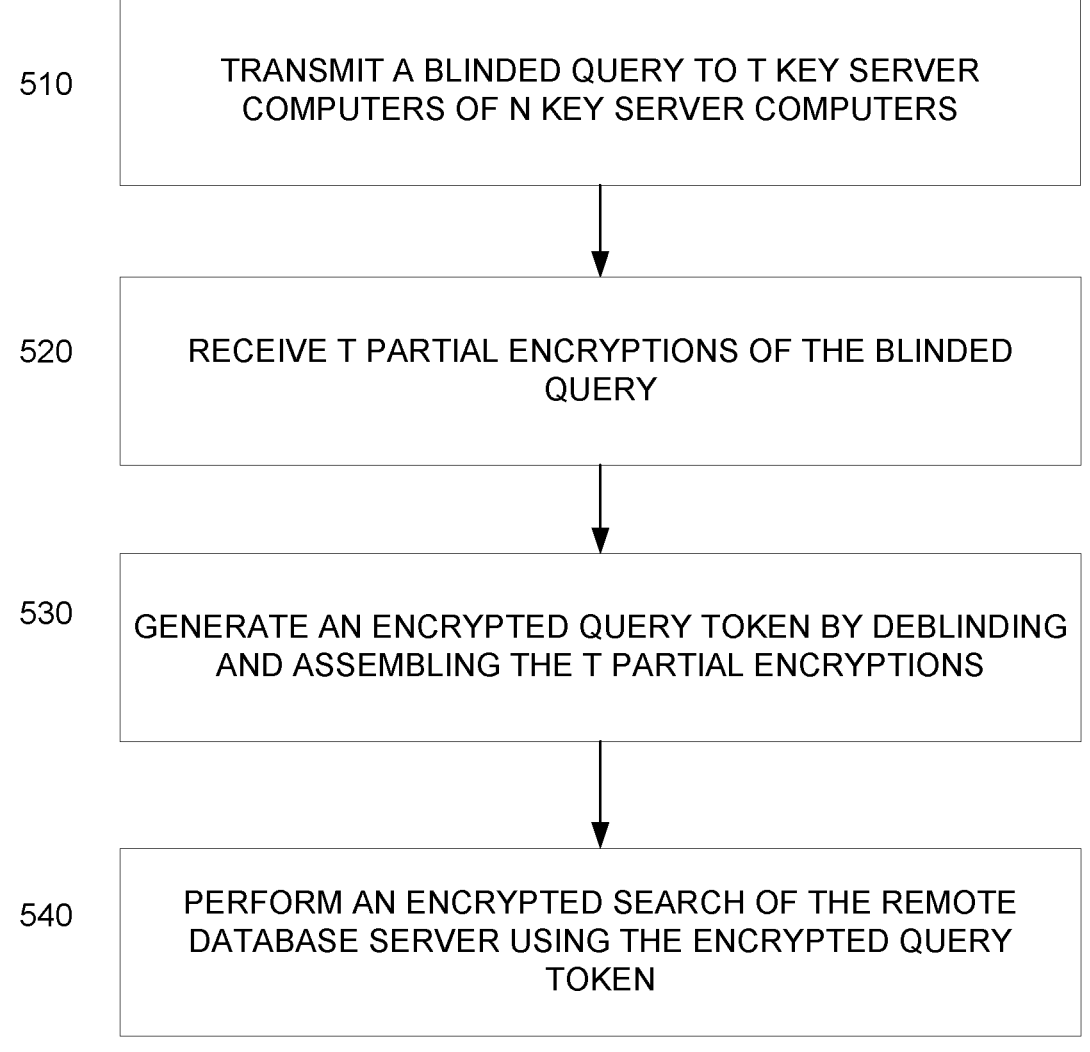
FIG. 5 shows a flow diagram of a method of performing a threshold searchable symmetric encryption according to an embodiment.

Methods described herein may be totally or partially performed with a computer system including one or more processors, which can be configured to perform the steps. Thus, embodiments are directed to computer systems configured to perform the steps of any of the methods described herein, potentially with different components performing a respective step or a respective group of steps. The method of performing a threshold searchable symmetric encryption may be carried out by a client computer using the aspects of the method disclosed in greater detail with reference to FIG. 5.

In block 510, the client computer can transmit a blinded query to T key server computers of the N key server computers. Each of the N key server computers can store a share of a cryptographic key from a data owner computer. The cryptographic key can be a symmetric key that can be used to perform both a symmetric encryption algorithm and a symmetric decryption algorithm. The T can be an integer less than N, and T shares of the cryptographic key are required to reconstruct the cryptographic key. The blinded query can be generated from a query configured to be sent to a remote database server that stores encrypted data. The encrypted data can be data encrypted by the data owner computer using the cryptographic key. The query can be blinded as the client computer may want to keep the query secret to the T key server computers. The query can be blinded with randomness only the client computer knows. Each of the N shares of the N key server computers can be unique.

In block 520, the client computer can receive T partial encryptions of the blinded query from the T key server computers. Each of the T partial encryptions can be generated by each of the T key server computers applying a first cryptographic function, or a symmetric encryption algorithm, to the blinded query using a respective share of the T shares of the cryptographic key. In some embodiments, the client computer can obtain a partial encryption from each of the T key server computers using an oblivious pseudorandom function (PRF). The oblivious PRF can allow the client computer to learn the partial encryption from each of the T key server computers while each of the T key server computers learn nothing (e.g., query) from the interaction.

In block 530, the client computer can generate an encrypted query token by deblinding and assembling the T partial encryptions. Since T shares of the cryptographic key can be used to reconstruct the cryptographic key, T partial encryptions can be assembled to reconstruct the encrypted query token.

In block 540, the client computer can perform an encrypted search on the remote database server using the encrypted query token to determine an encrypted response. The client computer can perform the encrypted search by first transmitting the encrypted query token to the remote database server. The remote database server can then perform a search using the encrypted query token on the encrypted data to obtain the encrypted response. The encrypted response can then be sent to the client computer by the remote database server.

The client computer, upon receiving the encrypted response from the remote database server, can blind the encrypted response and transmit the blinded encrypted response to the T key server computers of the N key server computers. The client computer can receive T partial decryptions of the blinded encrypted response form the T key server computers. Each of the T partial decryptions can be generated by applying a second cryptographic function, or a symmetric decryption algorithm, to the blinded encrypted response by using a respective share of the T shares of the cryptographic key. The client computer can then generate a decrypted response by deblinding and assembling the T partial decryptions.

III. Threshold Authentication

Before the client computer can perform an encrypted search on a remote database server, the client computer may need to authenticate itself to the remote database server 410 first before it can in perform any encrypted searches. One way to receive an authentication to perform an encrypted search on the encrypted data is through using a threshold authentication scheme involving N key server computers.

The threshold authentication (TA) scheme, or a threshold token generation (TTG) scheme, can distribute the task of generating tokens for authentication among a set of N servers, such that at least a threshold T number of servers must be contacted to compute a token. For example, a token can be a complete signature signed by the primary user device to a challenge given by the remote database server to authenticate itself to the remote database server. TTG provides a strong unforgeability guarantee: even if T'<T of the servers are corrupt, any time a token on some new value x is needed, at least T–T' servers must be contacted.

These TTG schemes may be further defined, formally, as a tuple of four probabilistic polynomial time (PPT) algorithms (Setup, PartEval, Combine, Verify):

Setup($1^\kappa$, N, T)→($[\![sk]\!]$, vk, pp). This algorithm generates a secret key sk, shares $sk_1$, $sk_2$, . . . , $sk_N$ of the key, a verification key vk, and public parameters pp. Share $sk_i$ is given to party i. (pp will be an implicit input in the algorithms below.)

PartEval($sk_i$, x)→yi. This algorithm generates shares of token for an input. Party i computes the i-th share $y_i$ for x by running PartEval with $sk_i$ and x.

Combine($\{i, yi\}i \in S$)=: tk/$\perp$. This algorithm combines the shares received from parties in the set S to generate a token tk. If the algorithm fails, its output is denoted by $\perp$.

Verify (vk, tk)=: 1/0. This algorithm verifies whether token tk is valid or not using the verification key vk. (An output of 1 denotes validity.)

To check for consistency, for all K∈N, any N, T∈N such that T≤N, all ($[\![sk]\!]$, vk, pp) generated by Setup($1^\kappa$, N, T), any value x, and any set S⊆[N] of size at least T, if $y_i$←PartEval($sk_i$, x) for i∈S, then Verify(vk, Combine($\{(i, y_i)\}_{i \in S}$))=1.

TTG schemes also adhere to and satisfy the unforgeability property, which can be formally defined as, for all PPT adversaries Adv, there exists a negligible function negl such that the probability that the following Unforgeability game outputs 1 is at most negl(κ):

Unforgeability$_{TOP,Adv}$($1^K$, N, T):

---

- Initialize. Run Setup($1^\kappa$, N, T) to get (sk, vk, pp). Give pp to Adv.
- Corrupt. Receive the set of corrupt parties $\mathcal{U}$ from Adv, where T': = $|\mathcal{U}|$ < T. Give $\{sk_i\}_{i \in}\mathcal{U}$ to Adv.
- Evaluate. In response to Adv's query (Eval, x, i) for i ∈ [N]\$\mathcal{U}$, return $y_i$: = PartEval($sk_i$, x). Repeat this step as many times as Adv desires.
- Challenge. Adv outputs ($x^a$, $tk^a$). Check if
  - |$\{i$ | Advmadeaquery(Eval, $x^a$, i)$\}$| < T − T' and
  - Verify(vk, $x^a$, $tk^a$) = 1.

Output 1 if and only if both checks succeed.

---

Thus, a TTG scheme may be confirmed to be unforgeable by first running Setup ($1^k$, N, T) to get ($[\![sk]\!]$, vk, pp). The public parameters (pp) are given to an adversary, Adv. Then a set of corrupt parties B is obtained from Adv, where T':|B|<T. The secret key shares, $\{sk_i\}_{i \in B}$, are given to Adv. In response to Adv's query, (Eval, x, i) for i∈[n]\B, calculate and return $y_i$ PartEval($sk_i$, x). This step can be repeated as many times as Adv desires. Adv will then use those answers to output (x*, tk*). These values are used to check for unforgeability; if Adv's query (Eval, x*, i)$\}$|<T−T' AND the value of Verify (vk, tk*)=1, then the TTG scheme is unforgeable. The unforgeability property captures the requirement that it must not be possible to generate a valid token on some value if less than T–T' servers are contacted with that value.

A. Enrollment

Figure 6:
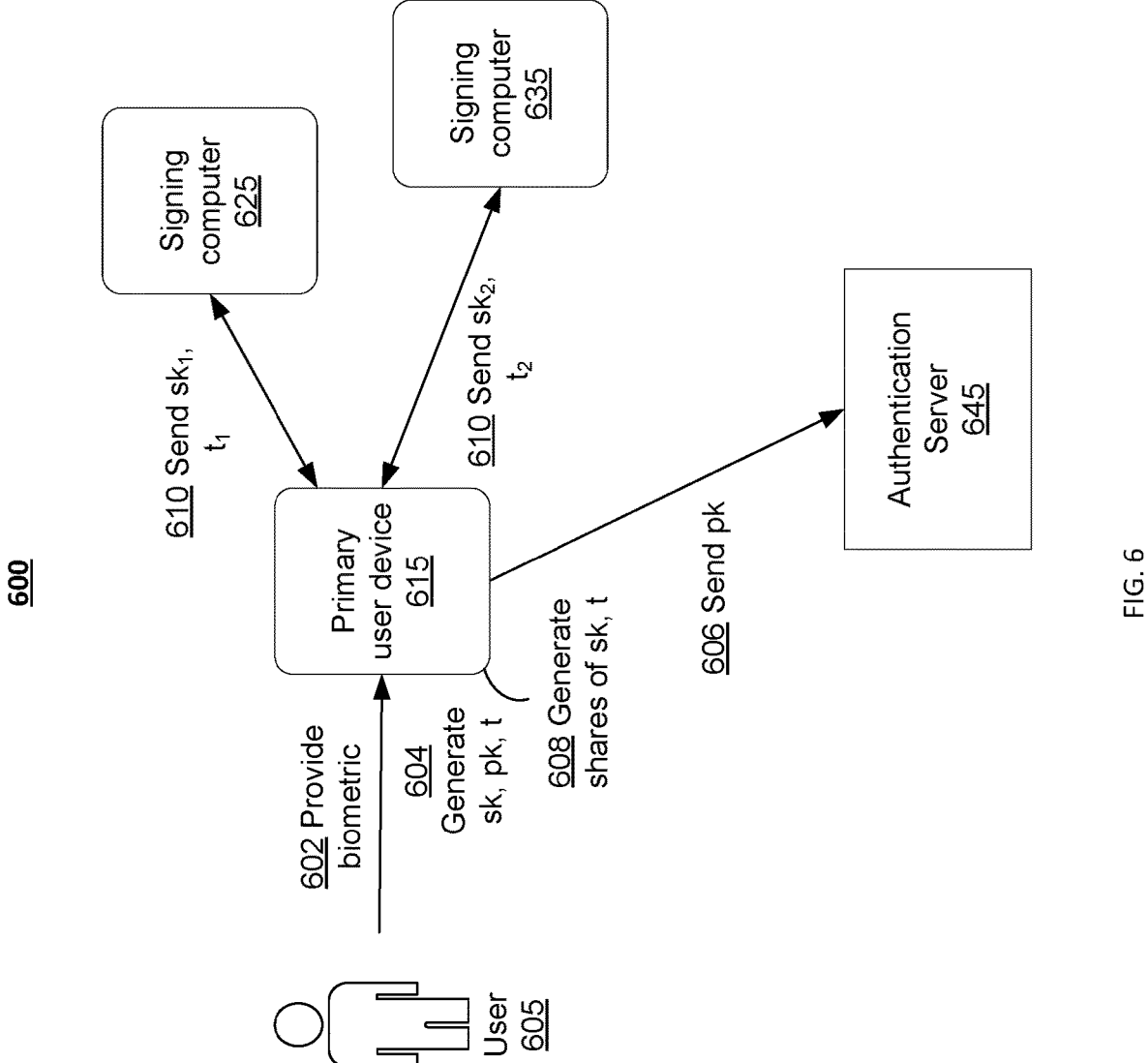
FIG. 6 shows a diagram illustrating a process of enrolling a user by using a threshold authentication.

FIG. 6 shows a diagram illustrating a process of enrolling a user 605 by using threshold authentication. The user 605 can enter a biometric measurement into a primary user device 615. The primary user device 615 can create a biometric template using the biometric information and enroll the biometric template by sending shares of the biometric template to N signing computers such as a signing computer 625 and a signing computer 635, which could be used to match a correct biometric template. In some embodiments, the primary user device 615 can be a client device in FIGS. 3 and 4, and the signing computer (625, 635) can be a key server computers from FIGS. 3 and 4.

In step 602, a user 605 can send first biometric information into the primary user device 615. The first biometric information can include measurement of first biometric features of the user. A biometric sensor of the primary user device 615 (e.g., a camera, a microphone, a fingerprint sensor) can be used to measure first biometric features of the user 605. For example, the user 605 can use a camera of the primary user device 615 to take a picture of their face for a facial scan. Other examples of the first biometric measurements may include voice recordings, iris scans, and fingerprint scans. The role of the primary device may also be performed by any trusted authority which may not be a device of the user. As an example, the primary device may be a computer of an authentication system.

In step 604, upon receiving the first biometric information, the primary user device 615 can generate a secret-public key pair for an asymmetric encryption scheme. The primary user device 615 can also use the first biometric information to create a biometric template. The biometric template may include a template vector, and the template vector may comprise measured values of the first biometric features of the user. For example, the primary user device 615 may compute distances between facial features identified in the picture of the user's face. In some embodiments, the primary user device 615 may use a machine learning models to generate such biometric template using the first biometric features of the user. The computed distances may comprise the template vector of the biometric template.

In step 606, the primary user device 615 can transmit the public key to an authentication server 645. In some embodiments, The authentication server 645 can be a remote database server from FIGS. 3 and 4. The authentication server 645 can securely store the public key.

In step 608, the primary user device 615 can generate N shares of the secret key of the secret-public key pair and N shares of the biometric template, as well as any other parameters that might be needed for later authentication.

In step 610, the primary user device 615 can transmit N shares of the secret key of the secret-public key pair, N shares of the biometric template, and N shares of other parameters to N signing computers (625, 635) such that any combination of T shares is required to reconstruct the secret key and the biometric template. T can be an integer less than or equal to N. Signing computers may include, for example, laptops, smartphones, wearable devices, smart TVs, IoT connected devices, etc. Two signing computers are shown in FIG. 6. However, embodiments may comprise more or fewer devices associated with the primary user device 615. The primary user device 615 may now be registered.

As an illustrative example, a first share of the secret key $sk_i$ and a first share of the biometric template $t_1$ can be transmitted to the signing computer 625. A second share of the secret key $sk_2$ and a second share of the biometric template $t_2$ can be transmitted to the signing computer 635.

In some embodiments, the primary user device 615 can have a share of the secret key and a share of the biometric template. In such case, the primary user device 615 would send N−1 shares to N−1 signing computers such that the total number of shares including the primary user device 615 and signing computers is equal to N.

B. Device Authentication

Figure 7:
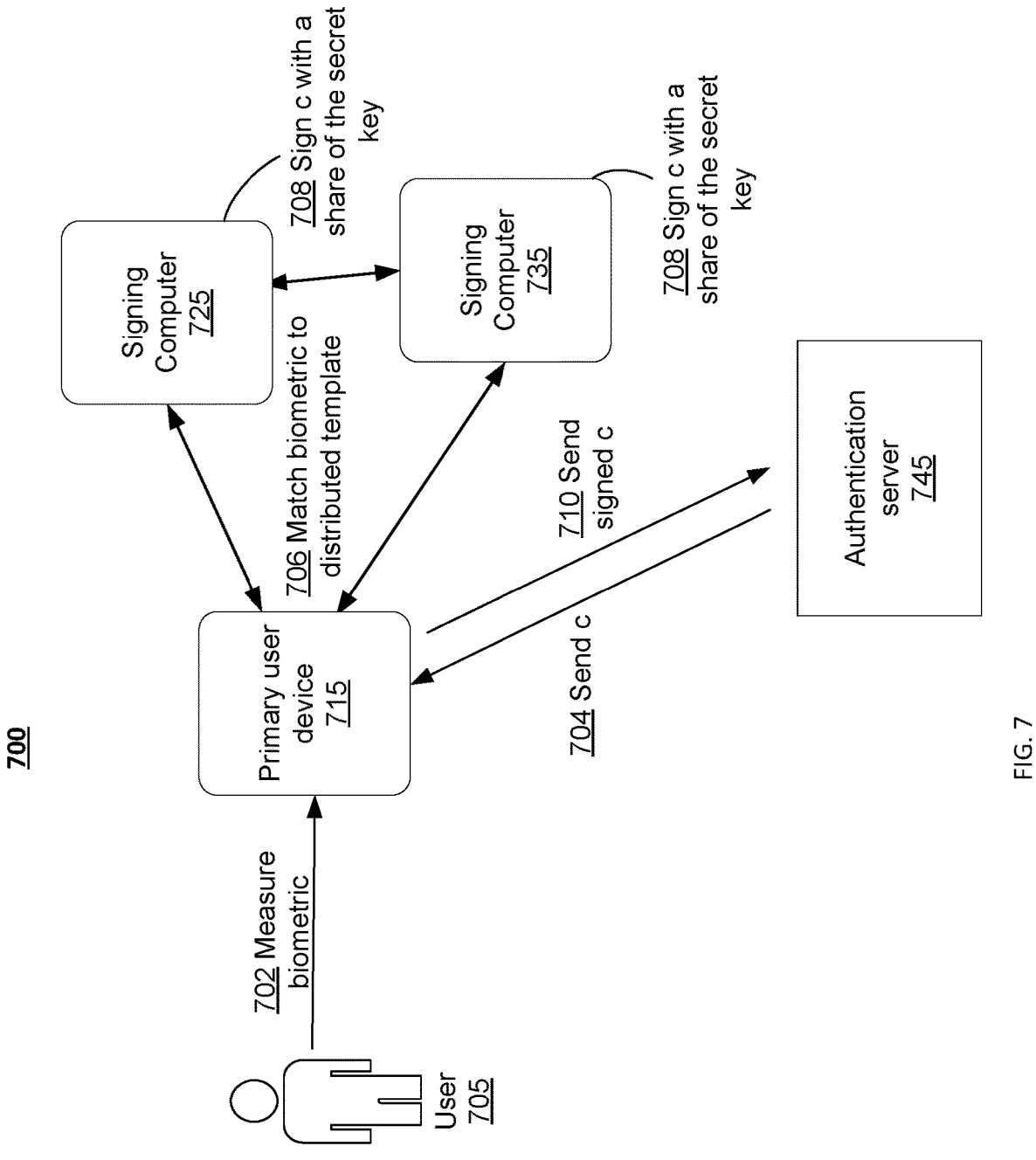
FIG. 7 shows a diagram illustrating a process of authenticating a user by using a threshold authentication.

FIG. 7 shows a general overview of device authentication with a distributed biometric when the primary user device 715 attempts to access a secure or protected resource. For example, the primary user device 715 can attempt to perform an encrypted search on encrypted data of an authentication server 745. In some embodiments, the primary user device 715 can be a client device in FIGS. 3 and 4, and the signing computer (725, 735) can be a key server computers from FIGS. 3 and 4. The authentication server 745 can be a remote database server from FIGS. 3 and 4.

In step 702, a user 705 can send second biometric information into a primary user device 715. The second biometric information can include measurement of second biometric features of the user. A biometric sensor of the primary user device 715 (e.g., a camera, a microphone, a fingerprint sensor) can be used to measure the second biometric features of the user 705. For example, the user 705 can use a camera of the primary user device 715 to take a picture of their face for a facial scan. Other examples of the second biometric measurements may include voice recordings, iris scans, and fingerprint scans. The primary user device 715 may then generate a measurement vector that comprises measured values of the second biometric features. For example, the measured values may be computed distances between facial features of the user. The second biometric information can include the measurement vector.

In step 704, the authentication server 745 can send a challenge message to the primary user device 715. The challenge message may be a vector.

In step 706, upon receiving the second biometric information from the user and the challenge from the authentication server 745, the primary user device 715 and other signing computers (725, 735) can match the previously distributed biometric template with the second biometric information. The primary user device 715 can transmit the second biometric information including the measurement vector and the challenge message to T signing computers among the N signing computers. In some embodiments, the N signing computers can be N key server computers from FIGS. 3 and 4. T can be an integer less than or equal to N. In FIG. 7, the T is equal to N. Each of the T signing computer 725, 735 can match the measurement vector with their template share. For example, an inner product may be computed between the template share and the measurement vector.

In step 708, each of the T signing computers (725, 735) can sign the challenge message (c) with the secret key share upon the second biometric information including the measurement vector and the biometric template including the template share matching. The signed share may be, for example, a partial encryption of the challenge message with the respective key share. For example, the signing computer 725, upon matching the second biometric information with the first share of the biometric template $t_1$, can sign the challenge message using the first share of the secret key $sk_i$ to determine a first signed share. After generating each signed share, each signing computer of the T signing computers (725, 735) can send the a signed share to the primary user device 715. Upon receiving the T signed shares of the challenge message from the T signing computers, the primary user device 715 can assemble T signed shares of the challenge to configure a complete signature of the challenge message.

In step 710, the primary user device 715 can transmit the complete signature to the authentication server 745. If a valid signature is generated, then the authentication server 745 can use the previously provided public key to verify the signature and authenticate the user for access user device or a resource.

By performing the threshold authentication scheme in FIGS. 6 and 7, the client computer (e.g., primary user device) can now be authenticated to have an access to a secure resource stored in a remote database server (e.g., authentication server) such as performing an encrypted search on the remote database server.

IV. Computer System

Figure 8:
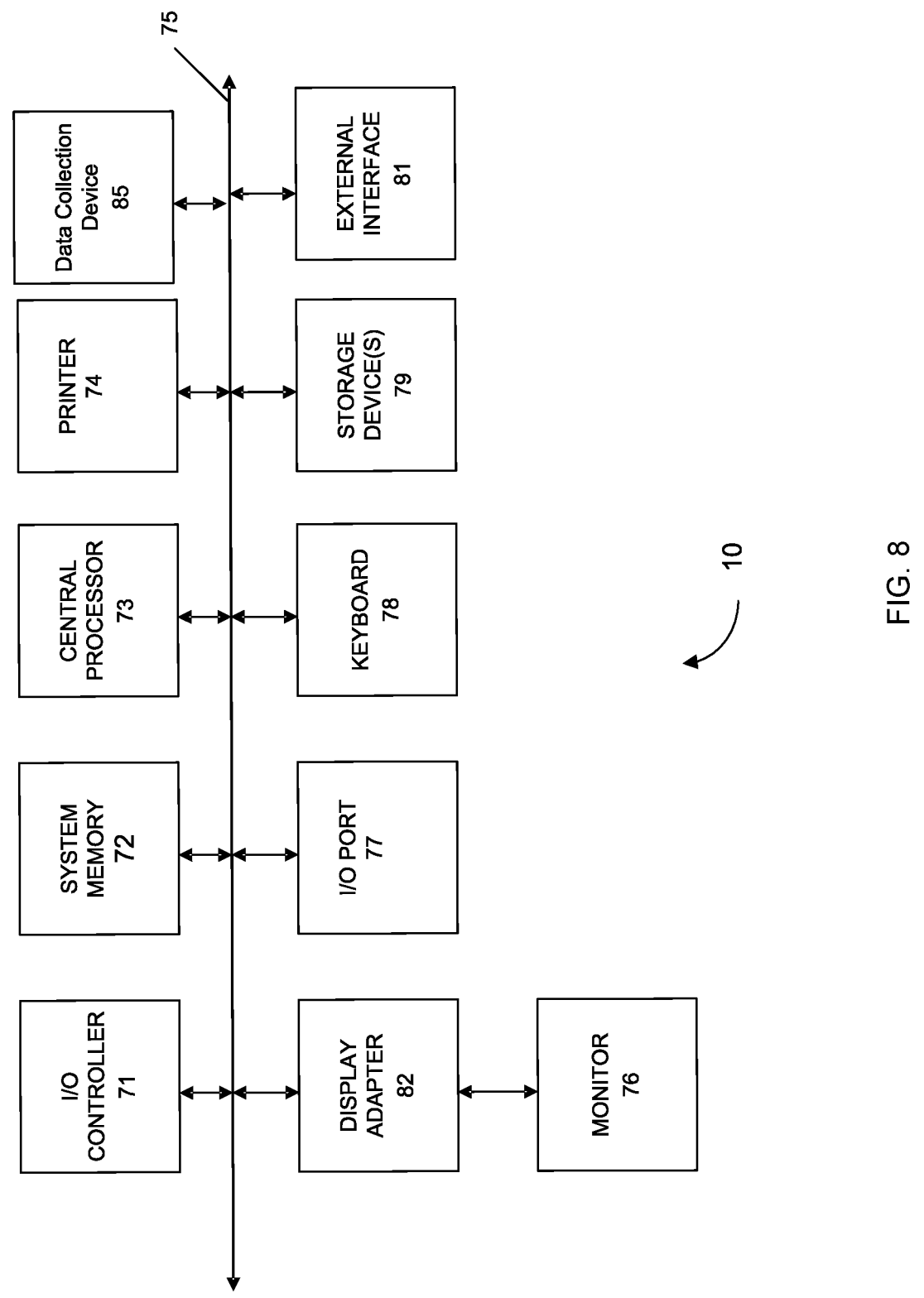
FIG. 8 shows a block diagram of an example computer system usable with systems and methods according to embodiments of the present invention.

Any of the computer systems mentioned herein may utilize any suitable number of subsystems. Examples of such subsystems are shown in FIG. 8 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 8 are interconnected via a system bus 75. Additional subsystems such as a printer 74, keyboard 78, storage device(s) 79, monitor 76 (e.g., a display screen, such as an LED), which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g., Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g., an application specific integrated circuit or field programmable gate array) and/or using computer software stored in a memory with a generally programmable processor in a modular or integrated manner, and thus a processor can include memory storing software instructions that configure hardware circuitry, as well as an FPGA with configuration instructions or an ASIC. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such devices. In addition, the order of operations may be re-arranged. A process can be terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Any operations performed with a processor may be performed in real-time. The term "real-time" may refer to computing operations or processes that are completed within a certain time constraint. The time constraint may be 1 minute, 1 hour, 1 day, or 7 days. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

The claims may be drafted to exclude any element which may be optional. As such, this statement is intended to serve as antecedent basis for use of such exclusive terminology as "solely", "only", and the like in connection with the recitation of claim elements, or the use of a "negative" limitation.

All patents, patent applications, publications, and descriptions mentioned herein are incorporated by reference in their entirety for all purposes. None is admitted to be prior art. Where a conflict exists between the instant application and a reference provided herein, the instant application shall dominate.

What is claimed is:

1. A method of performing a threshold searchable symmetric encryption comprising performing, by a client computer:

transmitting a blinded query to T key server computers of N key server computers, wherein the N key server computers store shares of a cryptographic key from a data owner computer, wherein T is an integer less than or equal to N, wherein T shares are required to reconstruct the cryptographic key, wherein the blinded query is generated from a query configured to be sent to a remote database server that stores encrypted data;

receiving, from the T key server computers, T partial encryptions of the blinded query, wherein each of the T partial encryptions is generated by applying a first cryptographic function to the blinded query using a respective share of the T shares of the cryptographic key;

generating an encrypted query token by deblinding and assembling the T partial encryptions; and performing an encrypted search on the remote database server using the encrypted query token;

wherein performing the encrypted search includes transmitting the encrypted query token to the remote database server, wherein the remote database server is configured to perform a search using the encrypted query token on the encrypted data to obtain an encrypted response;

wherein the encrypted query token is generated using a hash function, and wherein the remote database server is configured to use a lookup table to determine the encrypted data corresponding to the encrypted query token.

2. The method of claim 1, wherein the method further comprises:

receiving, by a primary user device, a first biometric information from a user, generating, by the primary user device, a biometric template using the first biometric information and a secret-public key pair, transmitting, by the primary user device, a public key of the secret-public key pair to the remote database server, transmitting, by the primary user device, shares of a secret key of the secret-public key pair and the biometric template to N signing computers such that any combination of T shares are required to reconstruct the secret key.

3. The method of claim 2, further comprising performing, by the client computer:

receiving a second biometric information from the user, receiving a challenge from the remote database server, transmitting the second biometric information and the challenge to T signing computers among the N signing computers, receiving T signed shares of the challenge from the T signing computers, wherein the T signed shares of the challenge are generated by the T signing computers in response to the second biometric information and the biometric template matching, assembling the T signed shares of the challenge to configure a complete signature, transmitting the complete signature to the remote database server, wherein the remote database server is configured to authenticate the client computer for access to the T key server computers by validating the complete signature using the public key.

4. The method of claim 3, wherein the primary user device is the client computer.

5. The method of claim 3, wherein the N signing computers are the N key server computers.

6. The method of claim 3, wherein the encrypted data is data encrypted by the data owner computer using the cryptographic key.

7. The method of claim 3, wherein the first biometric information includes measurement of first biometric features of the user and the second biometric information includes measurement of second biometric features of the user.

8. The method of claim 7, wherein the biometric template includes a template vector, wherein the template vector comprises measured values of first biometric features.

9. The method of claim 8, wherein the second biometric information includes a measurement vector, wherein the measurement vector comprises measured values of the second biometric information of the user.

10. The method of claim 9, wherein the second biometric information and the biometric template matching includes matching shares of the template vector with the measurement vector.

11. The method of claim 1, wherein the method further comprises: receiving the encrypted response from the remote database server; blinding the encrypted response to determine a blinded encrypted response; transmitting the blinded encrypted response to the T key server computers of the N key server computers; receiving, from the T key server computers, T partial decryptions of the blinded encrypted response, wherein each of the T partial decryptions is generated by applying a second cryptographic function to the blinded encrypted response using the respective share of the T shares of the cryptographic key; and generating a decrypted response by deblinding and assembling the T partial decryptions.

12. The method of claim 11, wherein the first cryptographic function is a symmetric encryption algorithm and the second cryptographic function is a symmetric decryption algorithm.

13. The method of claim 1, wherein the cryptographic key is a symmetric key.

14. The method of claim 1, wherein the blinded query is transmitted to X key server computers, wherein the X is in a range of T<X≤N.

15. A computer product comprising a non-transitory computer readable medium storing a plurality of instructions that when executed cause a computer system to perform a method of performing a threshold searchable symmetric encryption, the method comprising:

transmitting a blinded query to T key server computers of N key server computers, wherein the N key server computers store shares of a cryptographic key from a data owner computer, wherein T is an integer less than or equal to N, wherein T shares are required to reconstruct the cryptographic key, wherein the blinded query is generated from a query configured to be sent to a remote database server that stores encrypted data;

receiving, from the T key server computers, T partial encryptions of the blinded query, wherein each of the T partial encryptions is generated by applying a first cryptographic function to the blinded query using a respective share of the T shares of the cryptographic key;

generating an encrypted query token by deblinding and assembling the T partial encryptions; and performing an encrypted search on the remote database server using the encrypted query token;

wherein performing the encrypted search includes transmitting the encrypted query token to the remote database server, wherein the remote database server is configured to perform a search using the encrypted query token on the encrypted data to obtain an encrypted response;

wherein the encrypted query token is generated using a hash function, and wherein the remote database server is configured to use a lookup table to determine the encrypted data corresponding to the encrypted query token.

16. A system comprising:

a non-transitory computer readable medium; and one or more processors configured to execute instructions stored on the non-transitory computer readable medium to perform a method of performing a threshold searchable symmetric encryption, the method comprising:

transmitting a blinded query to T key server computers of N key server computers, wherein the N key server computers store shares of a cryptographic key from a data owner computer, wherein T is an integer less than or equal to N, wherein T shares are required to reconstruct the cryptographic key, wherein the blinded query is generated from a query configured to be sent to a remote database server that stores encrypted data;

receiving, from the T key server computers, T partial encryptions of the blinded query, wherein each of the T partial encryptions is generated by applying a first cryptographic function to the blinded query using a respective share of the T shares of the cryptographic key;

generating an encrypted query token by deblinding and assembling the T partial encryptions; and performing an encrypted search on the remote database server using the encrypted query token;

wherein performing the encrypted search includes transmitting the encrypted query token to the remote database server, wherein the remote database server is configured to perform a search using the encrypted query token on the encrypted data to obtain an encrypted response;

wherein the encrypted query token is generated using a hash function, and wherein the remote database server is configured to use a lookup table to determine the encrypted data corresponding to the encrypted query token.

* * * * *